(12) United States Patent
Ayukawa

(10) Patent No.: US 6,240,171 B1
(45) Date of Patent: May 29, 2001

(54) CALL CONTROLLING APPARATUS AND METHOD USED FOR AN ORDER-WIRE SYSTEM IN A COMMUNICATION SYSTEM

(75) Inventor: Ichiro Ayukawa, Tsukui-gun (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/778,453

(22) Filed: Jan. 3, 1997

(30) Foreign Application Priority Data

Jun. 10, 1996 (JP) .................................................... 8-147559

(51) Int. Cl.[7] .............................. H04M 1/60; H04M 9/00
(52) U.S. Cl. ............................ 379/167; 379/171; 379/173
(58) Field of Search .................................... 379/156–157, 379/159–160, 164, 167, 171–173, 177–179, 142

(56) References Cited

U.S. PATENT DOCUMENTS

| | | | |
|---|---|---|---|
| 3,944,752 | * | 3/1976 | Stearn et al. . |
| 5,280,523 | * | 1/1994 | Lee ....................................... 379/373 |
| 5,347,574 | * | 9/1994 | Morganstein .......................... 379/142 |
| 5,388,153 | * | 2/1995 | Burger et al. .......................... 379/156 |
| 5,408,525 | * | 4/1995 | Eldering ................................ 379/156 |
| 5,425,089 | * | 6/1995 | Chan et al. ............................ 379/164 |
| 5,481,605 | * | 1/1996 | Sakurai et al. ........................ 379/243 |
| 5,499,287 | * | 3/1996 | Campbell et al. ..................... 379/373 |
| 5,544,241 | * | 8/1996 | Dibner et al. ......................... 379/373 |
| 5,590,185 | * | 12/1996 | Sandler et al. ........................ 379/164 |
| 5,644,629 | * | 7/1997 | Chow .................................... 379/142 |
| 5,715,301 | * | 2/1998 | Terasaki et al. ....................... 379/164 |

* cited by examiner

*Primary Examiner*—Duc Nguyen
(74) *Attorney, Agent, or Firm*—Helfgott & Karas, P.C.

(57) ABSTRACT

A call controlling apparatus for receiving input signals each including a phone number through respective communication channels and making a call. The apparatus provides a plurality of telephones corresponding respectively to the channels and a storage storing respective phone numbers of the telephones; detects the phone number in the input signals; determines in which input signals the phone number is detected; selects the phone number based on the determining; compares the selected phone number with those stored in the storage and makes the call on the corresponding telephone depending on a result of the comparison.

16 Claims, 3 Drawing Sheets

CALL CONTROLLING APPARATUS AND METHOD USED FOR AN ORDER-WIRE SYSTEM IN A COMMUNICATION SYSTEM

BACKGROUND OF THE INVENTION

1. Field of the Invention

The present invention relates to a call controlling apparatus and method used for an order-wire system which helps improve reliability and maintainability of a communication system.

In wire and radio transmission systems using the SDH (Synchronous Digital Hierarchy) transmission method, for example, a communication channel for the order-wire system is provided between terminal equipment for exchanging maintenance information and so on, through the channel, in order for maintenance personnel to mutually exchange maintenance information, for example. The communication-channel information is transmitted multiplexed with user information or a payload.

There are two types of channels for the order-wire system: a channel available only between tributary offices and that available between a terminal office and an intermediate repeater station of the communication network. Those channels are specified in E1 and E2 bytes respectively in the SDH transmission frame (hereinafter the channels via the E1 and E2 bytes are called E1 and E2 channels, respectively).

There have been practiced two ways of calling the other end by using the order-wire system: a way to use an oral sound and the other to give an audible signal such as a ringing tone which is sounded by sending a dual tone multiple frequency (abbreviated to DTMF) signal. The present invention relates to the latter way of the order-wire system. Accordingly, a call controlling device which is high in reliability of the device and high in maintainability of the communication system is in great demand.

2. Description of the Related Art

FIG. 1 shows a network system which the present invention is applied to. The network system includes terminal equipment 70 provided between wire transmission lines and terminal equipment 80 provided between wire and radio transmission lines. For easy understanding of the order-wire system, the terminal equipment are simplified and intermediate repeater stations which are provided between terminal equipment, are omitted in FIG. 1.

The terminal equipment using the SDH transmission method, for example, is comprised of transceivers (XCVR) 71/75 and 81/85 corresponding to up/down lines, for transmitting and receiving a transmission signal; data controllers (DCONT) 72/74 and 82/84 corresponding to up/down lines, for extracting and inserting E1- and E2-byte signals from and in the transmission signal; and order-wire controllers (abbreviated to ORDW CONT) 73, 83 for controlling the order-wire system.

The order-wire system is equipped with first and second telephones for communicating respectively via the E1- and E2-byte signals (hereinafter may called E1 and E2 channels). It extracts the E1- and E2-byte signals from the transmission signal and decodes the signals to reproduce sound and voice on the telephones. It also encodes sound and voice generated from the telephones into E1- and E2-byte signals and inserts the signals in the transmission signal.

Prior to communication via voice, a calling party sends out the E1-byte signal, for example, into which the phone number of the first telephone is encoded, with the signal inserted in the transmission signal. In a called party, the E1-byte signal is extracted from the received transmission signal and encoded into a DTMF signal, for example, which in turn is decoded into a phone number. When the phone number is detected as belonging to one of the first and second telephones, a call is made on the telephone by sounding a ringing tone.

In a call controlling device of the related art, using the DTMF signal, for example, there were two methods of controlling a call:

The first method had two sets each of a telephone for receiving a call, a DTMF decoder for decoding a DTMF signal into a digital phone-number signal and a call controller for making a call on the telephone based on the phone-number signal, each set corresponding respectively to the E1 and E2 channels. Thus, the E1- and E2-byte signals were respectively input to the DTMF decoder and each set detected and controlled a call directed to the first and second telephones independently.

The second method had a single set of a telephone, a DTMF decoder and a call controller. The E1- and E2-byte signals were selectively input to the DTMF decoder by using a manual switch to detect and control a call to the telephone.

It is a problem of the related art that the call controlling device of the first method is large-sized and costly and decreases in reliability of the device because it requires large amount of circuitry including two separate sets of the circuits. It is another problem of the related art that the call controlling device of the second method decreases in maintainability of the system because it involves a manual switching operation, preventing maintenance personnel from communicating immediately as occasion demands.

SUMMARY OF THE INVENTION

It is an object of the present invention to provide a call controlling device of the order-wire system, which is small-sized, low-cost and high in reliability of the devices. It is another object of the present invention to provide a call controlling device of the order-wire system, which is high in maintainability of the communication system.

To achieve the above and other objects, the present invention provides a plurality of indicators, a plurality of detectors and a call controller. In a call controlling apparatus for receiving input signals including a call signal through respective communication channels and making a call, a plurality of the indicators corresponding respectively to the channels indicate the call. A plurality of the detectors corresponding respectively to the channels respectively detect the call signal in the input signals. The call controller makes the call on the indicators based on the call signals detected by the detectors.

BRIEF DESCRIPTION OF THE DRAWINGS

FIG. 1 shows a network system which the present invention is applied to;

Throughout the above-mentioned drawings, identical reference numerals are used to designate the same or similar component parts.

DESCRIPTION OF THE PREFERRED EMBODIMENTS

Figure 1:
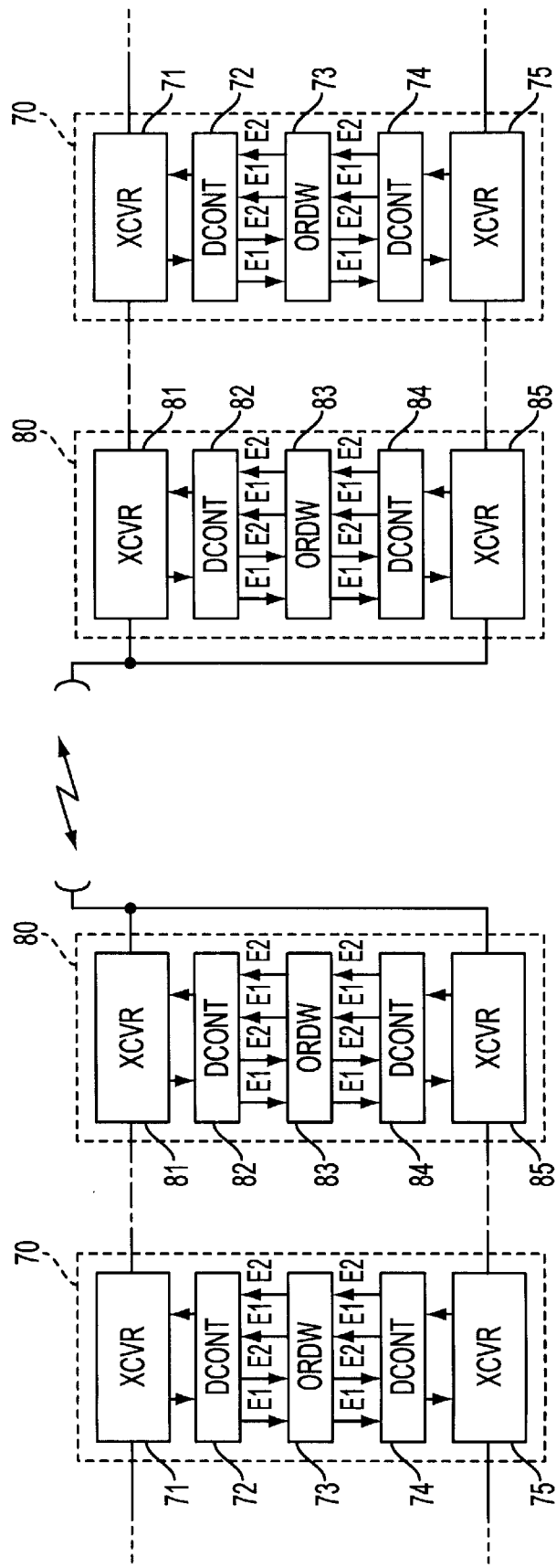
Figure 2:
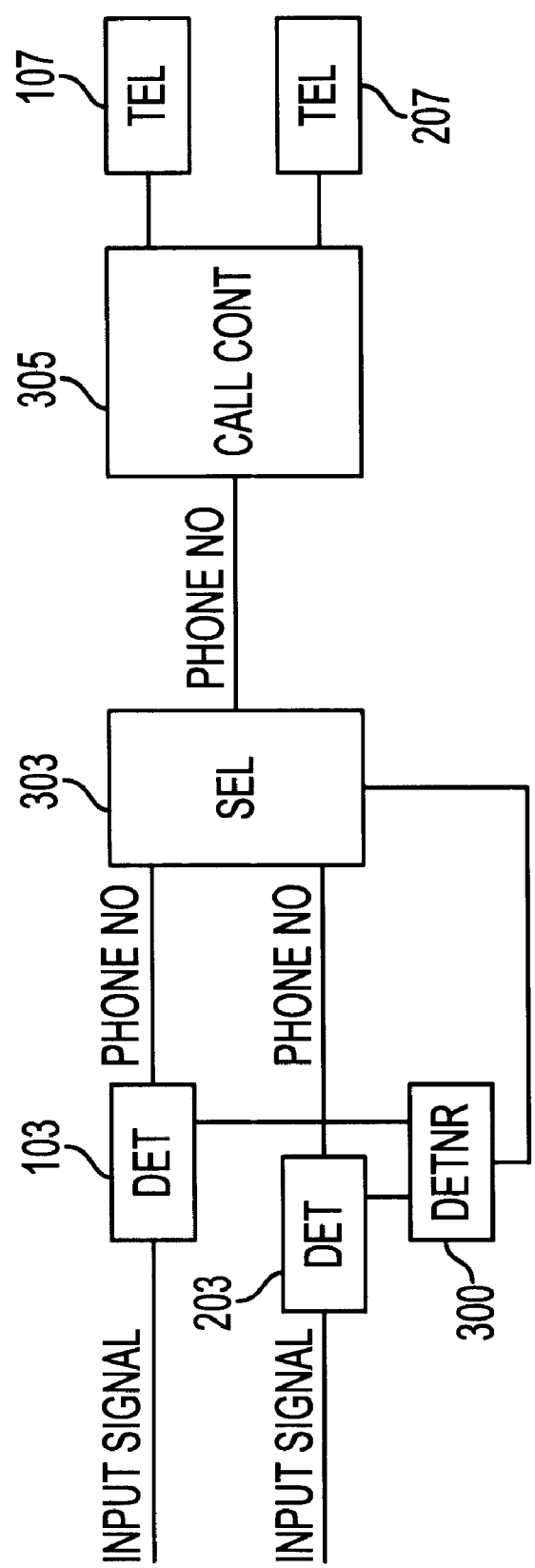
FIG. 2 is a block diagram illustrating the principle of the call controlling device of the present invention.

FIG. 2 is a block diagram illustrating the principle of the call controlling device of the present invention. The call controlling device is comprised of detectors (DET) 103, 203, a selector (SEL) 303, a determiner (DETNR) 300, a call controller (CALL CONT) 305 and telephones (TEL) 107, 207.

Input signals each including a call signal consisting of a phone-number signal preceded by a predetermined signal, are input to the call controlling device through respective communication channels. The detectors 103, 203 which are responsive to the input signals, each detect therein the predetermined signal and phone numbers. The determiner 300 checks the detector outputs for the predetermined signal to determine which detector has detected the phone number.

The selector 303 selects one of respective outputs of the detectors 103, 203 based on the determination by the determiner 300. The call controller 305, which has a phone number list (not shown) for the telephones 107, 207, compares the phone number selected by the selector 303 with those of the list and on a match, conducts the call control so as to give a ringer tone to the corresponding telephone.

Thus, the selector 303 selectively outputs to the call controller 305, the phone number detected by the detectors 103 based on the determination by the determiner 300, meaning that a call is automatically received by one of the telephones without the maintenance personnel's intervention.

Figure 3:
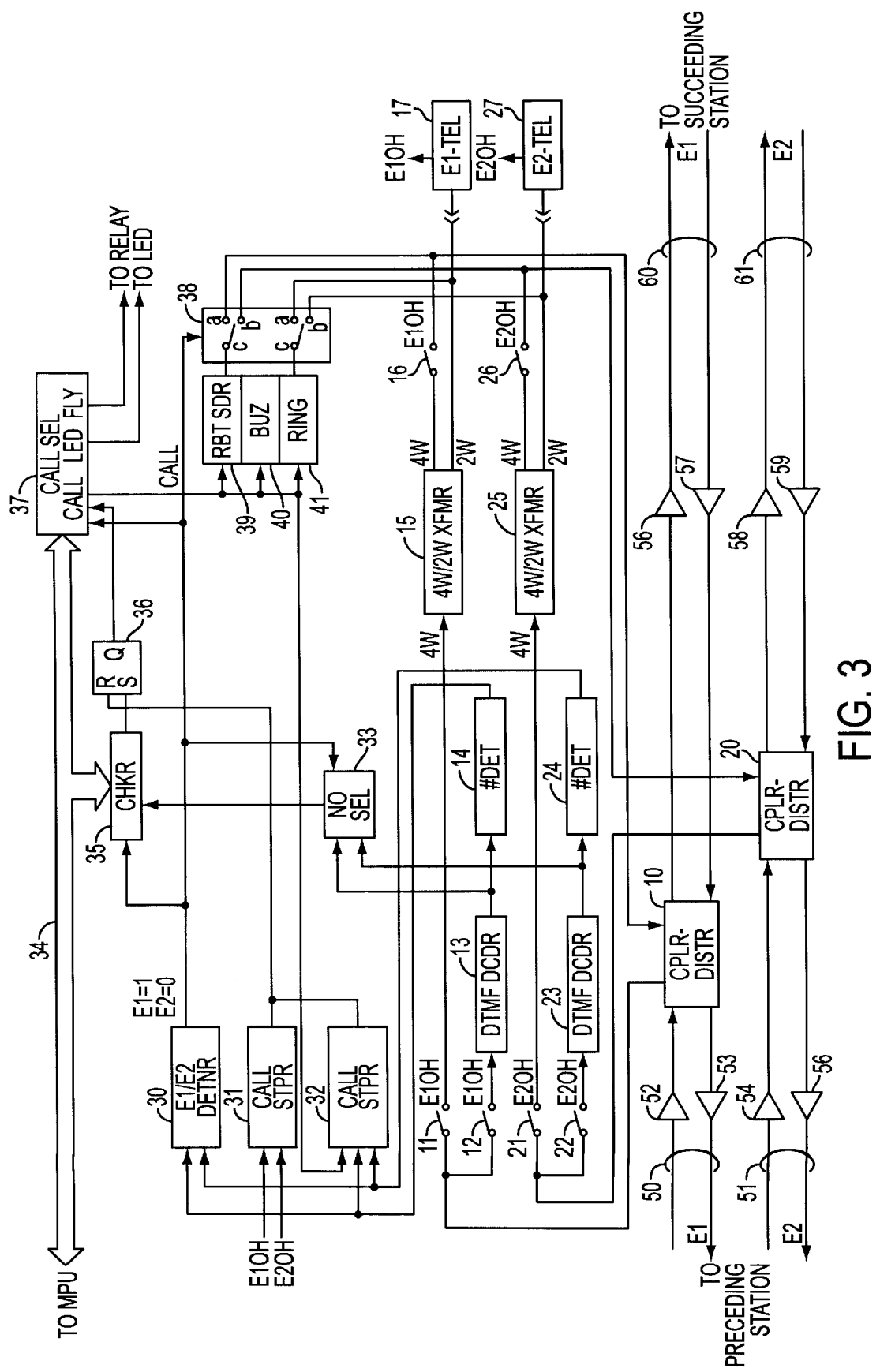
FIG. 3 is a detailed block diagram illustrating the call controlling device of the present invention.

FIG. 3 is a detailed block diagram illustrating the call controlling device of the present invention. The call controlling device shown in FIG. 3 is divided mainly into circuitry for detecting a call signal based on the E1- and E2-byte signals extracted from the transmission signal, circuitry for inputting telephone signals received from the line to the telephone and circuitry for sending telephone signals generated from the telephone to the line. The method for extracting/inserting the E1- and E2 byte signals from/in the transmission signal is well known and is not explained here.

Signal lines 50, 51 input/output the telephone signals (including call and voice signals) from/to the preceding station; and signal lines 60, 61 input/output the signals from/to the succeeding station. The signal lines 50, 51 input/output the E1- and E2-byte signals from/to the preceding station. The signal lines 60, 61 perform the same with respect to the succeeding station. Amplifiers 52–59 amplify the signals which are input/output from/to the signal lines 51, 52, 61 and 62.

A first sound coupler/distributor (CPLR-DISTR) 10 passes the telephone signal received from the preceding station to the succeeding station through the lines 50 and 60 or vice versa and distributes the signal to switches 11, 12. It also transmits to the signal lines 50, 60, a ringback tone (hereafter abbreviated to RBT) signal and a telephone signal output from an RBT sender 38 and a first 4W/2W transformer (4W/2W XFMR) 15, respectively. A second voice coupler/distributor (CPLR-DISTR) 20 performs the same operation for the signal lines 51, 61, switches 21, 22 and a second 4W/2W transformer (4W/2W XFMR) 25 as the first sound coupler/distributor 10.

First, a case is explained in which the E1-telephone (E1-TEL) 17 is called. In this example, a predetermined signal # is added to phone numbers, at the first-digit position thereof to form a call signal. The # is used in common with the telephones throughout the system. Thus, the E1-telephone 17 is assumed to have a phone number #0001.

A DTMF signal representing the number #0001, which is received from the preceding station, is input to the switches 11, 12 through the signal line 50 and the first voice coupler/distributor 10.

The switch 11 turns off (opens) and turns on (closes) when the E1-telephone 17 is in an on-hook state and in an off-hook state, respectively. To the contrary, the switch 12 turns on and turns off when the telephone is in the on-hook state and in the off-hook state, respectively. Thus, the switch 12 is on when a call is initiated and before the E1-telephone 17 is being called, at which time the telephone is in the on-hook state.

Accordingly, the DTMF signal representing the phone number #0001 is input to a first DTMF decoder (DTMF DCDR) 13. The first DTMF decoder 13 decodes the DTMF signal into a combination of 4-bit numeric data representing a digit of a phone number and a 1-bit timing signal.

A first # detector (# DET) 14, which is responsive to an output of the first DTMF decoder 13, outputs a high level (hereafter abbreviated to H) only while a signal representing the # is being input thereto. When the first # detector 14 outputs H, an E1/E2 determiner (E1/E2 DETNR) 30 outputs H. When the second # detector (# DET) 24 outputs H, the E1/E2 determiner 30 outputs a low level (hereafter abbreviated to L).

Therefore, a call is directed to the E1-telephone 17 or the E2-telephone 27 depending on whether the E1/E2 determiner 30 outputs H or L. When the E1/E2 determiner 30 outputs H, a number selector (NO SEL) 33 selectively outputs the output of the first DTMF decoder 13 to a number checker (CHKR) 35.

The number checker 35 previously holds the phone numbers of the E1-telephone 17 and E2-telephone 27, which numbers are set therein by a personal computer via the bus 34, for example. When the output of the E1/E2 determiner 30 is H, the number checker 35 recognizes that the output of the first DTMF decoder 13 (i.e., the signal resulting from the E1-byte signal) is coming from the number selector 33. The number checker 35 compares the phone number of E1-telephone 17 held therein with the number output from the number selector 33. When a result of the comparison is equal, the number checker 35 outputs H.

When the number checker 35 outputs H to the S input of an R-S flip-flop 36, the flip-flop 36 outputs H to a call selector (CALL SEL) 37. The call selector 37 has a calling method previously set therein by the personal computer. For example, a method is selected from lighting an LED or sounding a buzzer both provided in the terminal equipment or activating a remotely-located calling device by switching on/off a relay contact. A call to the telephone is controlled by a CALL signal output from the call selector 37.

With the call controlling device so constructed, a call to maintenance personnel is controlled as follows. When the flip-flop 36 outputs H to the call selector 37, the CALL signal is output (i.e., becomes H) to activate the RBT sender 39, buzzer 40 and/or ringer 41. The RBT sender 39 outputs a ringback tone to the calling party, indicating that the called party is being called.

On receiving H from the E1/E2 determiner 30, switches 38 close contacts "c" and "a". As a result, the RBT signal is transmitted from the RBT sender 39 to the signal lines 50, 60 as the E1-byte signal through the first voice coupler/distributor 10. Also, the output of the ringer 41 is sent to the E1-telephone 17 to call the maintenance personnel by giving a ringing tone.

Next, the maintenance personnel's talk over the telephone is controlled as follows. When the maintenance personnel lifts the E1-telephone receiver, an off-hook signal (E1OH) is generated. The signal controls switches 11, 12 and 16 and is sent to the first call stopper 31. On receiving the E1OH signal, the first call stopper 31 outputs H. The first call stopper 31 is designed so as to output H whichever signal E1OH or E2OH it may receive, to indicate the E1-telephone 17 or E2-telephone 27 is in the off-hook state.

On receiving H at the input R from the first call stopper 31, the flip-flop 36 outputs L. Then, the call selector 37 turns the CALL signal L, causing the RBT sender 39, buzzer 40 and ringer 41 to stop and therefore, to stop the call.

When the E1OH signal is H, the switches 11, 16 are turned on and the switch 12 is turned off. Therefore, the voice signal transmitted from the calling-party and received here through the E1 channel is carried to the E1-telephone 17 through the first voice coupler/distributor 10, switch 11 and the first 4W/2W transformer 15. Also, the voice signal generated from the E1-telephone 17 is transmitted to the E1 channel through the first 4W/2W transformer 15, switch 16 and the first voice coupler/distributor 10. Here, the line connecting the E1-telephone 17 to the first 4W/2W transformer 15 is a bidirectional 2-wire circuit, whereas the other lines connected to the first 4W/2W transformer 15 are unidirectional 4-wire circuits. The first 4W/2W transformer 15 converts a 4-wire-circuit signal to a 2-wire-circuit signal or vice versa.

When the maintenance personnel ends the talk and replaces the E1-telephone receiver, the E1OH signal becomes L, causing the switches 11, 12 and 16 to restore to the original state and the first call stopper 31 to output L. A call to the E2-telephone 27 is controlled in the same way as to the E1-telephone 17 except the following: On receiving H from the second # detector, the E1/E2 determiner outputs L and as a result, the switches 38 connect the contacts "c" to "b". Then, the number selector 33 selectively outputs the output of the second DTMF decoder 23 to the number checker 35.

Further, a case is explained in which while a call having a first phone number (with a first #) is being made to a telephone from a channel (e.g., E1 channel), another call having a second phone number (with a second #) is made to the other telephone from the other channel (e.g., E2 channel).

First, a case is taken in which the E1/E2 determiner 30 is outputting H after the first # detector 14 detects the first #, whereas the call selector 37 has not yet output the CALL signal. When the second # detector 24 detects the second # in this state, the E1/E2 determiner 30 outputs L to resume a call to the E2 telephone 27 in the same sequence as in the aforesaid call to the E1 telephone 17.

Second, a case is taken in which the E1 telephone 17 is being called after the first # detector 14 detected the first #, i.e., the switches 38 have the contact "c" connected to "a" and the call selector 37 is outputting the CALL signal with the E1/E2 determiner 30 outputting H. When the second # detector 24 detects the second # in this state, a second call stopper (CALL STPR) 32 functions as follows:

Except for the second call stopper 32, when the second # detector 24 detects the second #, the E1/E2 determiner 30 may output L and as a result, the switches 38 may connect the contact "c" to "b", eventually sounding a ringing tone on the E2 telephone 27 without even the second phone number being checked. To prevent this inconvenience, the second call stopper 32 is so designed as to output H when the second # detector 24 detects the second # while the CALL signal is H. That is, the CALL signal is turned off by resetting the flip-flop 36 when the second # is detected while a preceding call is in progress, to be prepared to detect a phone number coming from the E2 channel. Thereafter, the call to the E2 telephone 27 is controlled as in the aforesaid procedure to call the E2 telephone 27.

Hereinafter, a case is explained in which a telephone of this call controlling device makes a call on a telephone of another one. Lifting the E1-telephone receiver turns the E1OH signal H, causing the switches 11, 16 to turn on and the switch 12 to turn off. Accordingly, the E1 telephone 17 can transmit the phone number in the DTMF signal and receive a voice signal from an external telephone. A call made from the E2 telephone 27 is controlled in the same way.

As described above, in FIG. 2 and the associated description, for example, the present invention provides in the call controlling device, two detectors each for the E1 and E2 channels and only one call controller in common with the detectors. Thus, by having the detectors share the call controller and therefore, minimizing the amount of circuitry, the present invention provides a highly reliable call controlling device. Also, by having the call controller select one of the detectors that has detected the predetermined signal and therefore, automatically selecting one of the E1- and E2-telephones to which a call is directed, it provides a call controlling device which is high in maintainability of a communication system.

Although the # is used for an example, the particular signal is not limited to #, but may be any if it is the same throughout a system, or even different only if it is the same for each corresponding channel. Two channels (E1 and E2 channels) were taken for an example; however, the present invention can easily be applied to three or more channels. Moreover, the DTMF signal is used as an example; however, the call signal is not limited to the DTMF signal but may be of any type only if it can identify a telephone.

As is apparent from the above description, since the present invention allows plural communication channels automatically share only one call controller and thereby to make a call to a corresponding telephone, it can provide a small-sized, low-cost and high in reliability of the device and high in maintainability of a communication system.

What is claimed is:

1. A call controlling apparatus for receiving input signals including a call signal through respective communication channels and making a call, said apparatus comprising:

a plurality of indicators each corresponding to a respective one of the communication channels for respectively indicating a call thereon;

a plurality of detectors each corresponding to a respective one of the communication channels and said indicators, for respectively detecting the call signal included in the input signals; and a call controller for making the call on a corresponding one of said indicators based on the call signals detected by said detectors;

a selector for selecting one of the call signals detected by said detectors, and wherein said call controller makes the call based on the call signal selected by said selector.

2. The call controlling apparatus according to claim 1, wherein said apparatus further comprises a determiner for determining which of said detectors has detected the call signal, and wherein said selector selects based on the determining by said determiner.

3. The call controlling apparatus according to claim 2, wherein the call signal includes a predetermined signal and an identifier signal identifying a respective indicator, and wherein said detectors detect the predetermined signal and the identifier signal and said determiner determines based on the detection of the predetermined signal by said detectors.

4. The call controlling apparatus according to claim 3, wherein said apparatus further comprises a storage storing therein identifiers of said indicators, and wherein said call controller further compares the identifier signal included in the call signal which is selected by said selector with the identifier stored in said storage and makes the call depending on a result of the comparison.

5. The call controlling apparatus according to claim 3, wherein said apparatus further comprises a plurality of responders corresponding respectively to said indicators for responding to the call made by said call controller, and wherein said call controller stops the call being made when said responders respond.

6. The call controlling apparatus according to claim 3, wherein said call controller further stops the call being made when said detectors detect another predetermined signal.

7. A call controlling apparatus according to claim 5, further comprising:

transceivers corresponding respectively to said responders, for transmitting and receiving information; and a connector for operatively connecting one of said transceivers which corresponds to the responding one of said responders to the corresponding communication channel when said responders respond to the call so as to allow said transceivers to transmit and receive information through the communication channels.

8. A call controlling apparatus according to claim 7, wherein said transceivers are telephones, said responders are parts for off-hook functions thereof and said indicators are ringers thereof.

9. A call controlling method for receiving input signals including a call signal through respective communication channels and making a call, said method comprising the steps of:

(a) providing a plurality of indicators each corresponding to a respective one of the communication channels, for indicating a call thereon;

providing a plurality of detectors each corresponding to a respective one of the communication channels and said indicators, for respectively detecting the call signal included in the input signals; and (b) detecting by one said detector the call signal included in the input signals; and (c) making the call on a corresponding one of said indicators based on the call signal detected in step (b);

(d) selecting one of the call signals detected in step (b), and wherein said making the call in step (c) makes the call based on the call signal selected in step (d).

10. The call controlling method according to claim 9, wherein said method further comprises the step of (e) determining in which of the input signals the call signal is detected, and wherein said selecting in step (d) selects based on the determining in step (e).

11. The call controlling method according to claim 10, wherein said method further comprises the step of (f) including a predetermined signal and an identifier signal identifying a respective indicator in the call signal, and wherein said detecting in step (b) detects the predetermined signal and the identifier signal and said determining in step (e) determines based on the detection of the predetermined signal.

12. The call controlling method according to claim 11, said method further comprising the steps of:

(g) providing a storage storing therein identifiers of said indicators; and (h) comparing the identifier signal included in the call signal which is selected in step (d) with the identifiers stored in the storage and said making the call in step (c) makes the call depending on a result of the comparison.

13. The call controlling method according to claim 11, said method further comprising the steps of:

(i) responding to the call made in step (c); and (j) stopping the call made in step (c) according to the responding in step (i).

14. The call controlling method according to claim 11, said method further comprising the step of:

(k) stopping the call made in step (c) when said detecting in step (b) detects another predetermined signal.

15. A call controlling apparatus for receiving input signals including a call signal through respective communication channels and making a call, said apparatus comprising:

a plurality of indicators corresponding respectively to the communication channels for respectively indicating a call thereon;

a plurality of detectors corresponding respectively to the communication channels, for respectively detecting the call signal included in the input signals;

a selector for selecting one of the call signals detected by said detectors;

a determiner, coupled to said detectors, for determining which of said detectors has detected the call signal;

said selector selecting said one of the call signals based on determining by said determiner; and a call controller for making the call on a corresponding one of said indicators based on the call signal selected by said selector.

16. A call controlling method for receiving input signals including a call signal through respective communication channels and making a call, said method comprising the steps of:

(a) providing a plurality of indicators corresponding respectively to the communication channels, for indicating a call thereon;

(b) detecting the call signal included in the input signals;

(c) selecting one of the call signals detected in step (b), (d) determining in which of the input signals the call signal is detected, wherein said selecting step (c) selects said one of the call signals based on said determining step; and (e) making the call on a corresponding one of said indicators based on the call signal selected by said selecting step in step (d).

* * * * *